May 5, 1970          M. E. CROW          3,510,214
ADAPTER ACCESSORY FOR OVERHEAD PROJECTORS
Filed March 7, 1967          5 Sheets-Sheet 1
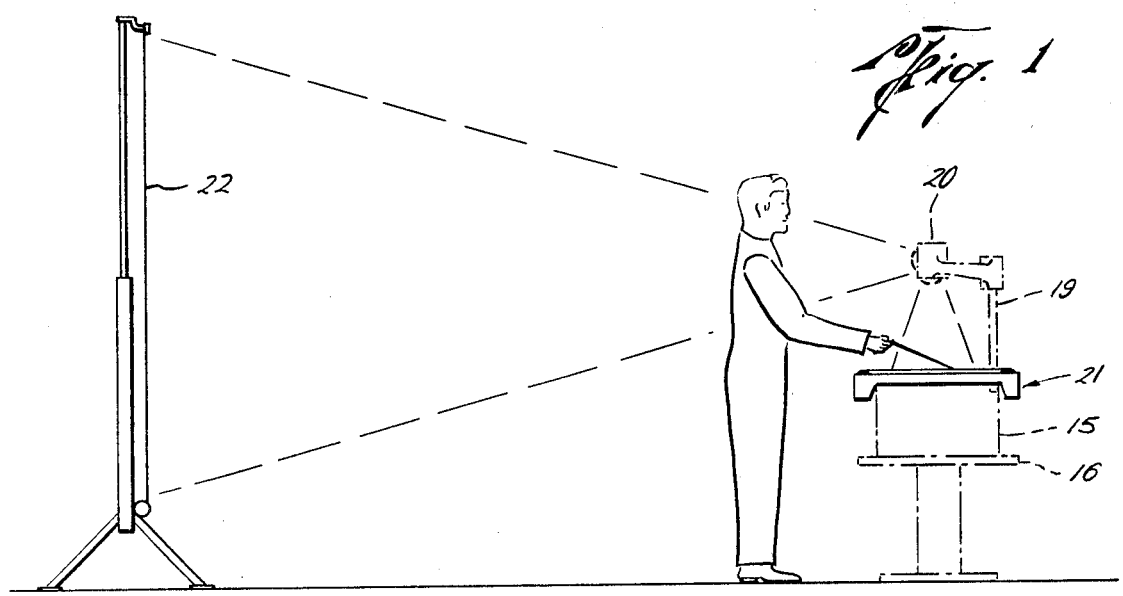
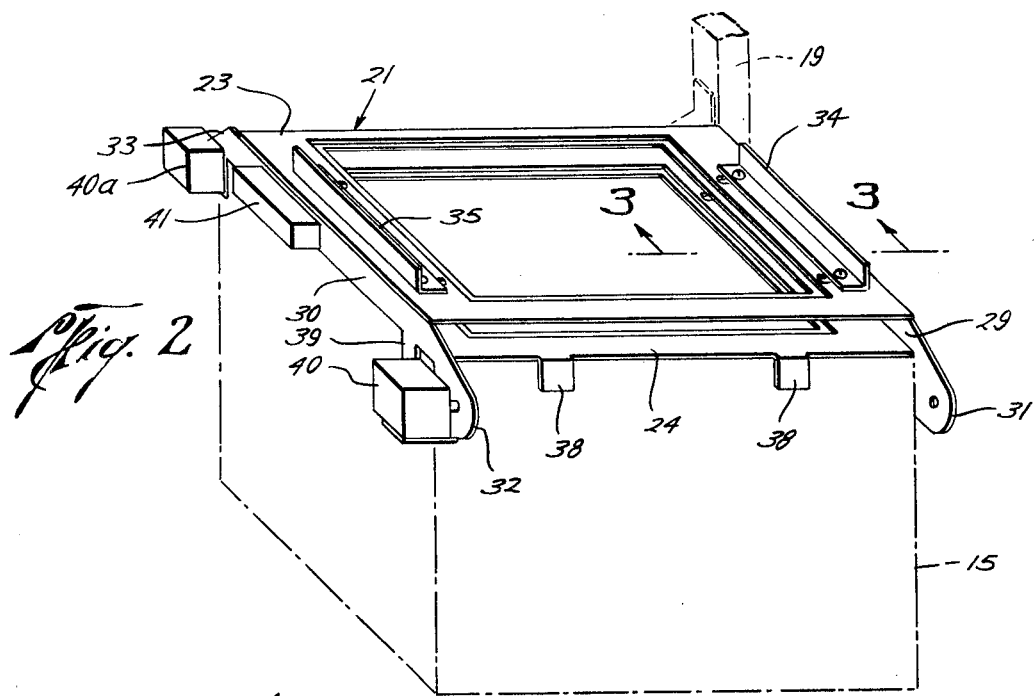
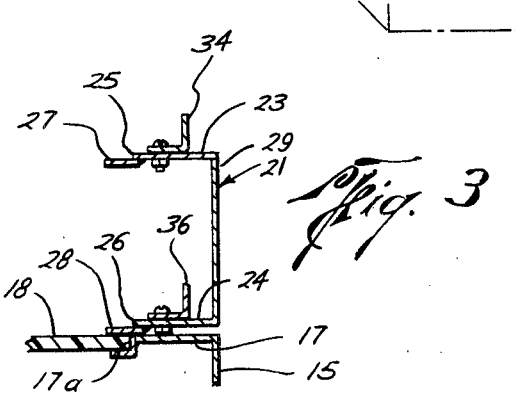
Marvin E. Crow
INVENTOR.
BY Bertram H. Mann
ATTORNEY

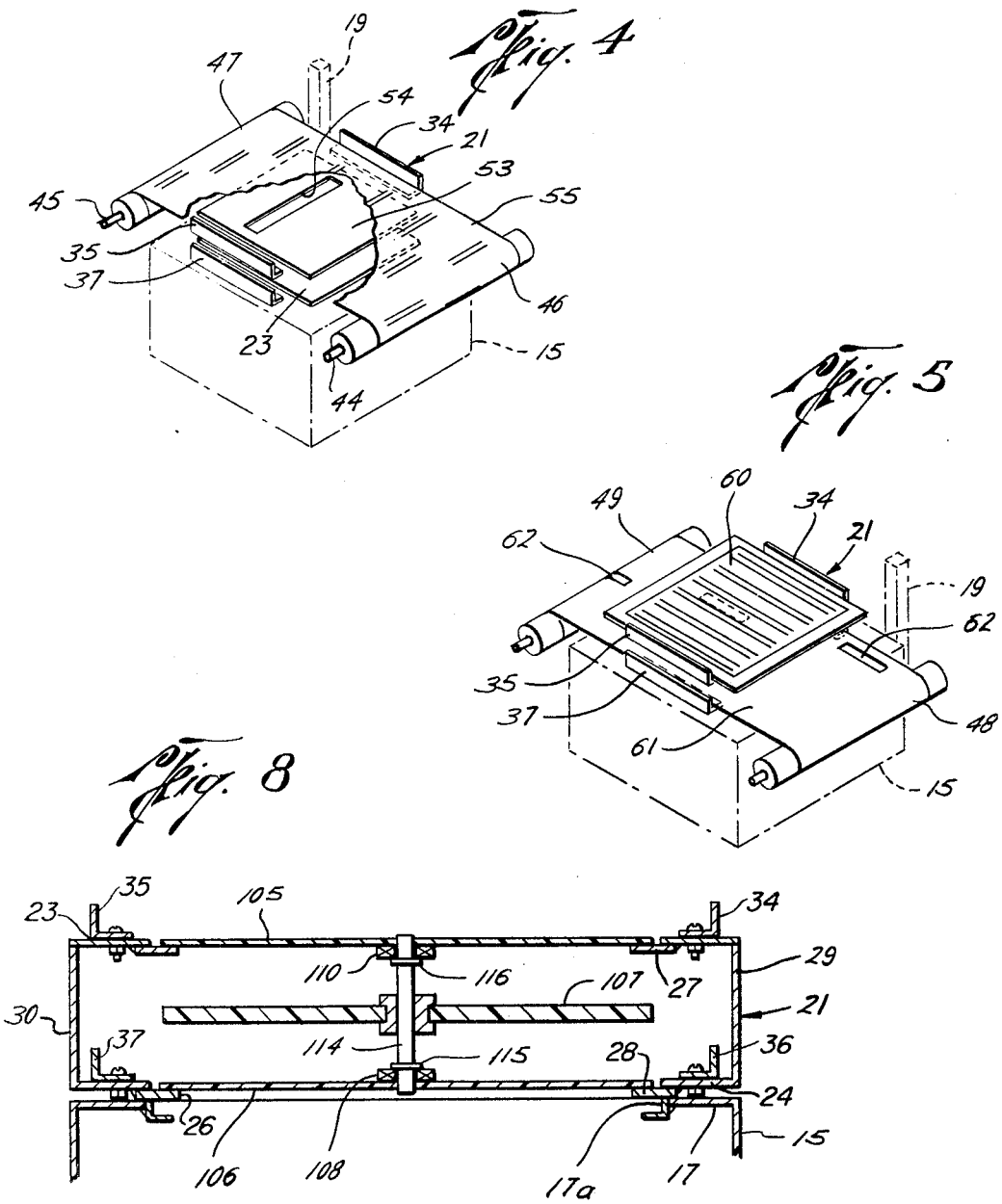

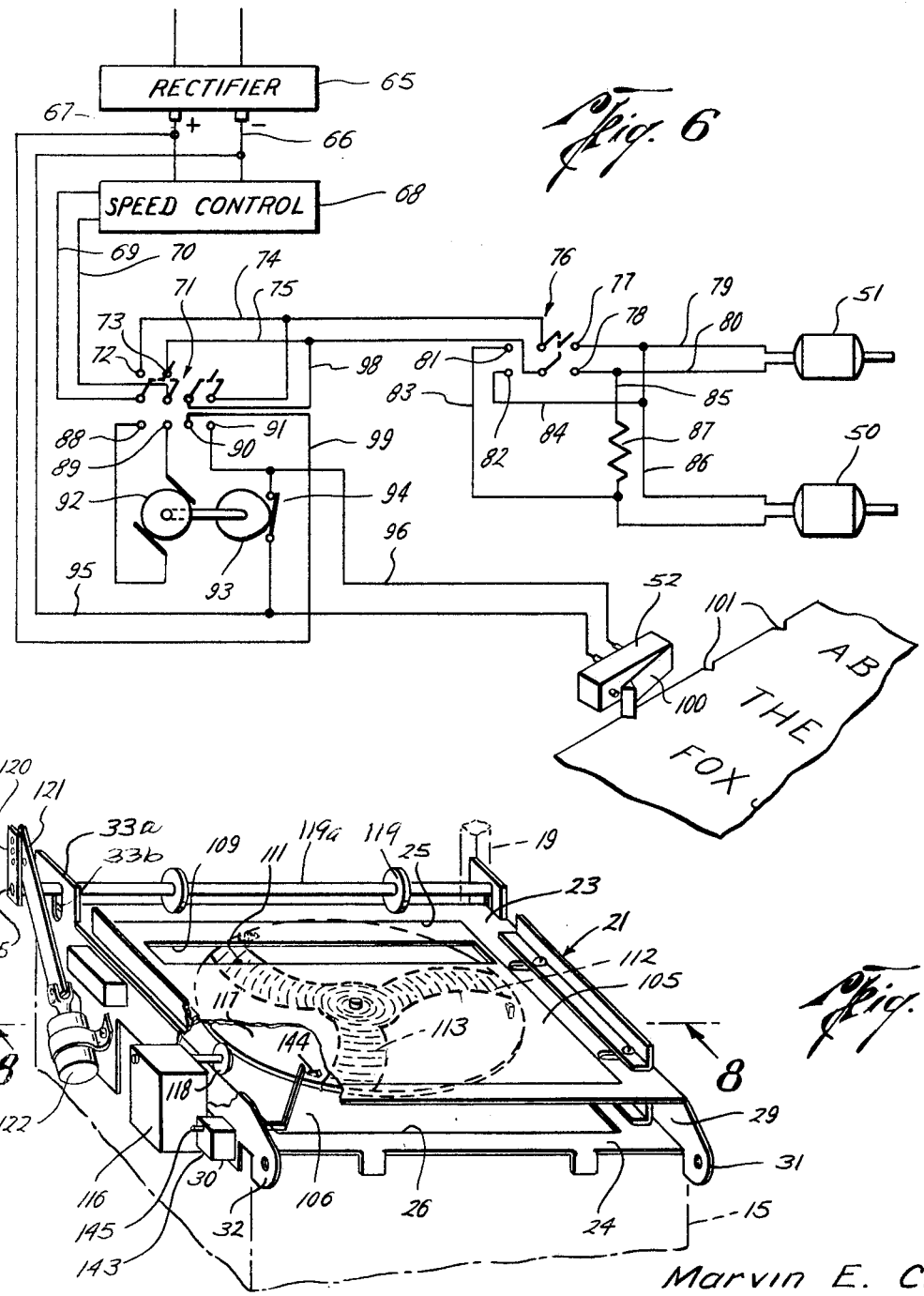

Marvin E. Crow
INVENTOR.

BY Bertram A. Mann
ATTORNEY

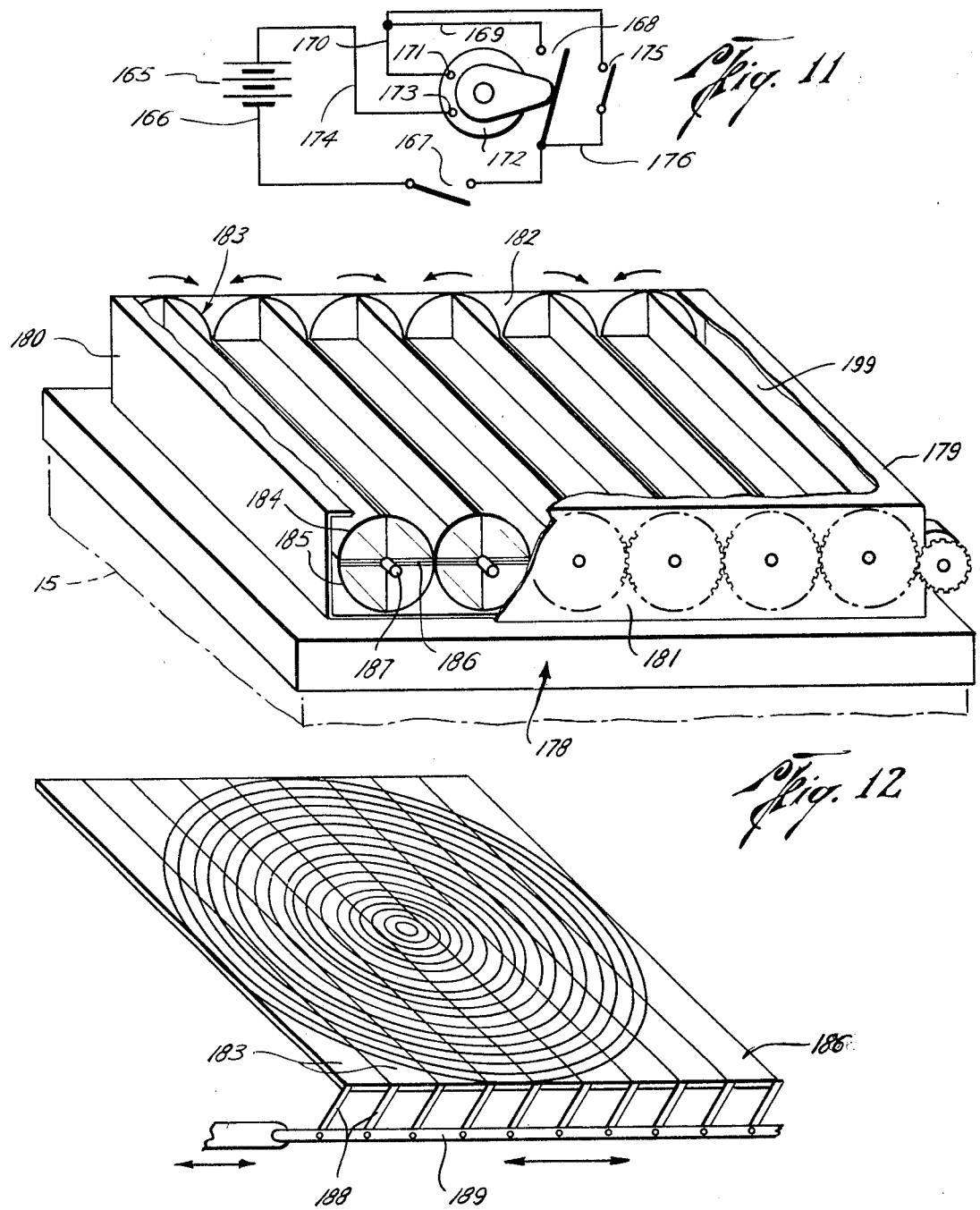

United States Patent Office 3,510,214
Patented May 5, 1970

3,510,214
ADAPTER ACCESSORY FOR OVERHEAD
PROJECTORS
Marvin E. Crow, 407 Hastings Road,
Belton, Tex. 76513
Filed Mar. 7, 1967, Ser. No. 621,185
Int. Cl. G03b 21/00, 21/14, 21/28
U.S. Cl. 353—21                                    13 Claims

ABSTRACT OF THE DISCLOSURE

An adapter frame for mounting on the illumination base of an overhead projector for presenting for projection various combinations of text sheets and masks so that the operator may follow the text on the adapter and face the audience, while the audience views the projected image on a screen. The masking and text arrangements provide for restricted, intermittent, or progressive projection of the text material. The adapter frame comprises a pair of parallel wall members spaced one above the other, each wall member having an aperture therein forming vertically aligned windows for registry with the display area of the projector. Guide bars are mounted on the upper sides of each of the wall members adjacent the apertures for guiding a masking element on one of the wall members and an indicia-bearing element on the other wall member.

BACKGROUND OF THE INVENTION

Field of the invention

This invention relates to apparatus for exhibition, as by projection onto a screen, of symbols or reading matter, for instance, for the purpose of instructing the viewer in recognition of such symbols or in improving his reading rate and comprehension.

Prior art

Rapid reading training and tachistoscopic devices heretofore developed have had certain disadvantages. For instance, most of these have utilized small image films which so reduce the effective projection light that darkening of the projection room is required and special, expensive projection materials must be purchased. Moreover, the operator of the projector cannot directly view the material being projected, including that prior and subsequent thereto, but rather must watch the projection screen, as do the students or other audience. Moreover, it is very difficult or impossible for the operator to prepare his own materials for use with such machines.

SUMMARY OF THE INVENTION

Accordingly, an object of the present invention is to provide a projector of the above type which can be used in a school room or lecture area without any dimming of the lights or drawing of the window shades.

Another object is to provide a projection accessory or adapter for use with commercial types of overhead projectors for momentarily or intermittently displaying symbols or reading matter, hereafter sometimes termed text material or indicia, appearing in a limited portion of the total viewing area of the projector.

Another object is to provide an adapter or accessory device which can be mounted upon the illumination base of an ordinary overhead-type projector in order to equip the projector for the special use mentioned.

Another object is to provide such a device which will accommodate materials to be projected in exposed position and of sufficiently large size as to be directly viewed in their entirety by the instructor or operator using the apparatus or by anyone wishing to view the material without the use of a projector.

Another object is to provide a projector of the above type which will accommodate substantially any type of material which the operator prefers to use, such as contact print transparencies made from pages from books, handwritten sheets, memoranda of various sizes, sheets of music, newspaper articles, and the like.

Another object is to provide novel masking means for momentarily or intermittently exposing for projection limited areas of an indicia sheet mounted immediately above or below the marking device.

Still another object is to provide novel projector means for scanning a sheet bearing indicia, such as reading matter.

These objects and others hereafter appearing are attained by the equipment illustrated in the accompanying drawings which consists, in general, of a shallow frame shaped to fit over and rest stably upon the illumination base or housing of a more-or-less standard type of overhead projector. The frame is provided with a pair of vertically superposed windows and guide structure in or adjacent which indica-bearing and masking and/or scanning members may be mounted and/or guided in superimposed relationship directly above the illumination opening of the projector base. Means are provided for moving at least one of these superposed members relative to another for progressively or momentarily exposing restricted areas of the indicia-bearing sheet. The mask member has one or more restricted windows which, however, are of adequate size to permit the passage of sufficient light so that the exposed indicia can be viewed on a screen properly positioned with respect to the apparatus, while the room is normally illuminated by daylight or artificial lighting. The indicia sheet may be prepared by transfer to a sheet or roll of suitable transparent material. However, if desired, the operator can mark directly on such material.

In one form of the invention, a special disk-type scanning device is provided which has radial or spiraled strips of lens structure—for instance, sections of a Fresnel condenser lens—for scanning the indicia sheet during rotation of the mark disk. In another form, a special mask is provided in the form of an elongated, rotatable lens member which will transmit light from the illumination source to project an image only when the lens members in a predetermined position.

BRIEF DESCRIPTION OF THE DRAWINGS

In the accompanying drawings which illustrate the invention,

FIG. 1 is a view of a more-or-less conventional, overhead-type projector being operated with my novel accessory adapter applied thereto;

FIG. 2 is an enlarged isometric view of an exemplary form of the novel adapter accessory;

FIG. 3 is an enlarged detail cross section taken on line 3—3 of FIG. 2;

FIG. 4 is a schematic isometric view illustrating one type of use of the adapter device;

FIG. 5 is a schematic isometric view illustrating another manner of using the novel adapter device;

FIG. 6 is a wiring diagram of suitable powering and control means for the adapter device shown in FIGS. 1 and 2;

FIG. 7 is an isometric view of another form of projection adapter;

FIG. 8 is a sectional view of the device in FIG. 7 taken on line 8—8 thereof;

FIG. 11 is a wiring diagram for the form in FIG. 10;

FIG. 12 is a perspective view of still another form; and

FIG. 13 illustrates diagrammatically the operation of the shutter mechanism in FIG. 12.

DESCRIPTION OF THE PREFERRED EMBODIMENTS

Figure 9:
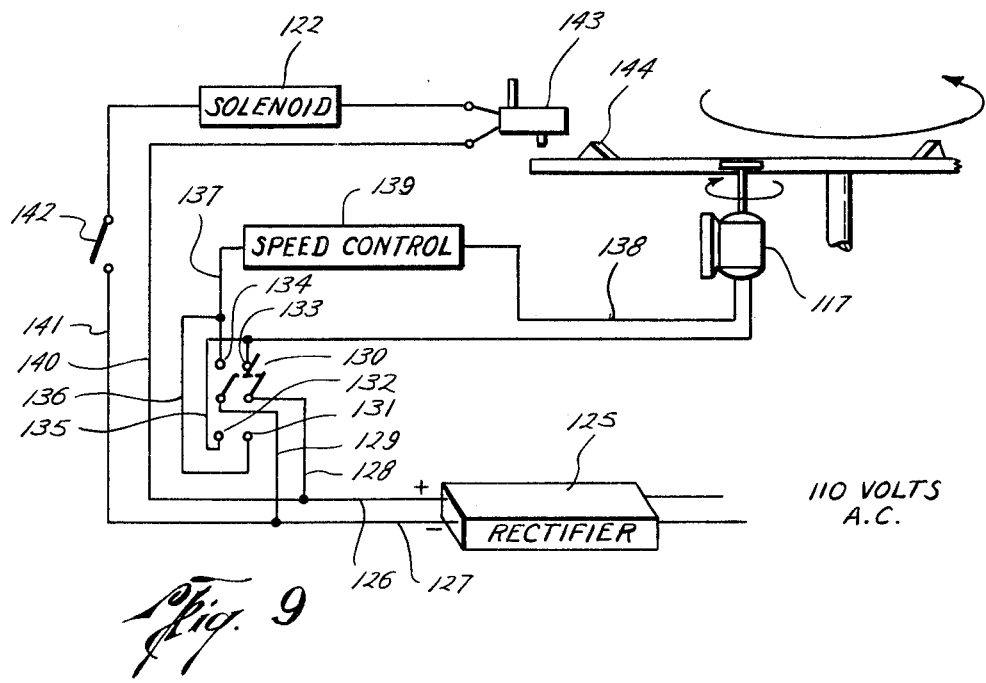
FIG. 9 is a wiring diagram showing control means for the equipment in FIG. 7.

FIGS. 1 and 2 illustrate a more-or-less conventional, overhead type of projector including a box-like base or housing 15 resting on a table 16 in which is housed an upwardly-directed light source (not shown) and which has an upper wall 17 with a lipped opening 17a in which is mounted a translucent plate 18 forming a display area and which usually is concentrically scored to form a Fresnel condenser lens. An upright post 19 is secured to the right rear corner of base 15 and adjustably carries a mirror-lens system, generally designated 20, which receives light beams from base 15 through condenser Fresnel lens 18 and any text and masking members on the novel adapter accessory, generally designated 21, and directs these beams horizontally toward a suitable screen 22 for displaying any text material on the adapter unit. The projection screen faces the side of the projector which is farthest from post 19 which is at the remote right-hand corner of the projector as viewed by the operator.

My novel accessory adapter, a form of which is shown at 21 in FIGS. 1 and 2, consists of top and bottom walls 23 and 24 centrally cut out as at 25 and 26 and provided with lips as at 27 and 28 which may be stamped in the metal, or separately formed and suitably secured thereto. The adapter is also provided with side frame pieces 29 and 30 from which bearing lugs project forwardly and rearwardly, as at 31, 32, and 33. Angle guide bars 34, 35, 36, and 37 are adjustably mounted along the sides of walls 23 and 24 for a purpose to be described. Position lugs as at 38 and 39 depend from lower wall 24 and the side frame pieces for stabilizing the adapter on illumination box 15. Projecting outwardly from side frame member 30 are housings 40 and 40a for roll turning motors and housing 41 within which various controls hereafter referred to are mounted. Bottom wall 24 and the side frame parts are shown as formed form a single cut and folded metal sheet—for instance, aluminum—with top wall 23 secured to the upper edges of the side frames. Other materials may be used and the assembly method varied.

Pairs of lugs 31 and 32 and 33 and its counterpart on frame 29 are for the purpose of accommodating pintles or shaft ends, as at 44 and 45, at the ends of feed and take-up mounts for rolled, flexible sheeting, as at 46 and 47 in FIG. 4 and 48 and 49 in FIG. 5. Roll actuating motors 50 and 51 (FIG. 6) are mounted in housings 40 and 40a. Microswitch 52 is located in housing 41.

The adapter-accessory frame has great versatility, as suggested in part in FIGS. 4, 5, and 8. For instance, in FIG. 4, the adapter frame is mounted with side pieces 29 and 30 extending along the sides of box 15, as in FIG. 8, but omitted from FIGS. 4 and 5 for clarity, post 19 being at the rear right-hand corner thereof. A mask sheet or plate 53, opaque except for an elongated window 54, is received in opening 25 of top wall 23, or, in this instance, it might just as well be mounted in bottom wall opening 26. Text sheet 55 slides along and rests on the upper face of top wall 23 so that light beams passed by stationary window 54 pass through the portion of sheet 55 directly thereabove and project any text or indicia thereon onto screen 22. Such text might consist of lines of words traversing sheet 55. If sheet 55 is advanced intermittently from front roll 46 to rear roll 47, the lines of words will be progressively exposed and projected, each for a predetermined time interval. The operator, standing in front of box 15, may readily view the full size material being projected as well as everything else on the exposed face of sheet 55, while the audience, whom he faces, may see only what is passed by window 54. Alternatively, the text material may be placed on roll 55 in groups of words of any length in staggered arrangement so that continuing text is progressively projected. Mask sheet 53, in effect, constitutes a kind of shutter.

In FIG. 5, the adapter frame is mounted transversely on box 15 and a transparent sheet 60 containing text material is placed in upper wall opening 25. Alternatively, sheet 60 may be positioned by upper guide bars 34 and 35. Flexible sheet 61 forms the mask or shutter and, preferably, is opaque except for staggered windows 62 and moves rightwardly from roll 49 to roll 48. The mask sheet slides along lower wall structure 24 and is guided by angle bars 36 and 37. The stationary text sheet 60 may be provided with reading matter which is scanned by the windows 62 to progressively project limited parts thereof.

Many other combinations of masks and text or indicia sheets may be devised for different instructional or training purposes. For instance, columns of numbers for mathematical computations may be projected and various tachistoscopic effects may be achieved.

FIG. 6 illustrates diagrammatically the controls used in connection with the adapter of FIG. 2. A source of power, as the transformer-rectifier 65 connected to a conventional source of 110-volt current, is connected by wires 66 and 67 to a speed control 68 (conveniently in housing 41), thence by wires 69 and 70 to a 4-pole, double throw switch 71. Contacts 72 and 73 of this switch are connected by wires 74 and 75 to a 2-pole, double throw, reverse-forward switch 76. Contacts 77 and 78 of this switch are connected by wires 79 and 80 to motor 51 which actuates one of the rolls 46–49. Contacts 81 and 82 of this switch are connected by wires 83, 84, 85, and 86 to motor 50 which operates the other roll. Wires 85 and 86, the former including a resistance 87, also connect through wires 79 and 80 to motor 51. The arrangement is such that when contacts 77 and 78 of switch 76 are closed, both motors 50 and 51 operate in one direction, while, when the other contacts 81 and 82 are closed, the motors operate in opposite directions. Resistance 87 provides a drag on the roll from which the acetate is being drawn so as to insure the taut positioning of the acetate across the top of the projector.

When previously-mentioned switch 71 is in its position to close contacts 72 and 73, motors 50 and 51 will be driven steadily in one direction or the other, as explained. With switch 71 in its opposite position, closing contacts 88, 89, 90, and 91, a small motor 92, also located in housing 41, will be energized so as to rotate a cam 93 causing periodical opening and closing of a switch 94. A power line 95, connected to transformer-rectifier 65, leads through previously-mentioned microswitch 52, thence by means of wire 96, switch contact 91, and a wire 97 to the blade of motor control switch 71, the return being by means of wires 75 and 98, the blade of switch 71, switch contact 90, and a wire 99. This arrangement is such that, when microswitch detent 100 drops into one of the notches 101 in the edge of one of the rolled sheets 55 or 61, for instance, the motors will be temporarily stopped, provided cam switch 94 is also open, until the latter switch closes. However, as long as detent 100 rides upon an unnotched edge of the moving sheet, motors 50 and 51 will be kept in operation irrespective of the periodical opening of bypass switch 94. Thus, switches 94 and 52 constitute a timing device for controlling the period during which the movable roll will be stationary.

In the form of FIGS. 7 and 8, substantially the same adapter structure is used, including side frames 29 and 30 and vertically-spaced horizontal walls 23 and 24 with lipped, rectangular openings 25 and 26. Mounted in these openings are plates or sheets 105 and 106 of sufficient rigidity to support a scanner wheel 107. Lower plate 106 is transparent and centrally mounts a bearing element 108. Plate 106 may be skeletonized or may be replaced by a spider as the lower bearing support. Upper plate 105 is opaque and has a narrow, transverse window 109. On the underside of upper plate 105 and vertically aligned with lower bearing element 108 is an upper bearing element 110.

Rotatably mounted between top and bottom walls 23 and 24 is the novel scanning condenser wheel 107 of laminated construction and sufficiently rigid to be self-supporting. Secured between the outer laminations are the generally helical lens spokes 111, 112, and 113 of special construction arranged at 120-degree intervals about axial mounting shaft 114. Spokes 111–113 constitute spiral sections of a Fresnel lens disk with concentric scorings. At least the portions of the encompassing laminations abreast the spokes are transparent. Shaft 114 is provided with end thrust collars 115 and 116.

Scanner wheel 107 is rotated by a small motor 117 (FIG. 9) in housing 116 through a drive wheel 118. The text or indicia transparency (not shown) may be mounted on rolls between pairs of lugs as 31 and 32 with drive motors as in the first form. However, a special intermittent drive is illustrated, including friction rollers 119 on shaft 119a, and resting on top wall 23 of the adapter. The ends of the shaft are slidable in slots 33b in upstanding lugs 33a. The text sheeting resting on top wall 23 is advanced as desired by means of a lever 120 secured to roll shaft 119a and adjustably connected by means of a link 121 to a solenoid 122. Each time solenoid 122 is energized, the rear roll is turned so as to advance the text sheet a small amount, for instance, sufficient to move a succeeding line of text abreast of window 109. During rotation of wheel 107, spokes 111–113 will successively progress across window 109, thus progressively directing toward the lens system 20 the restricted portion of text in the window and in line with the spoke portion spanning the window. This form is well adapted for use with indicia sheets or rolls, providing uniform advance steps in each instance.

The interlocking controls for the scanner wheel and the text transparency are illustrated in FIG. 9. Power is supplied through transformer-rectifier 125 and wires 126, 127, 128, and 129 to the blade of a combination reversing and on-off switch 130. Reversed polarity contacts 131 and 132 and 133 and 134 connect by means of wires 135, 136, 137, and 138 through speed control rheostat 139 to scanner wheel actuating motor 117. Power is also conducted by means of wires 140 and 141, the latter including manual switch 142, to solenoid 122 which actuates the text feeding roller. Also in circuit 140, 141 is a microswitch 143 which is cyclically closed by a camming projection 144 on disk 107.

In operation of the form in FIGS. 7–9, with the adapter frame in position on top of a projector base 15 with the Fresnel condenser lens of the projector removed, and a sheet of textual or indicia-bearing material stretched across the top thereof between rolls (not shown) mounted in lugs 31–33, switch 130 will be closed in the direction to produce clockwise rotation of scanning disk 107 and manual switch 142 will be closed. Only that restricted area of the text film which directly overlies the portion of a lens spoke 111–113, which, in turn, directly underlies mask slot 109, will be projected. Thus, the text slot will be scanned by a particular spoke, as 111 in FIG. 7. Thereafter, microswitch 143 will be actuated by cam 144 on disk 107 to energize solenoid 122 and advance the text film the desired amount. Where reading matter is impressed on the text film, the size of window 109 and the advance distance of the text film will be just sufficient to progressively position a line at a time adjacent window 109 for scanning. Where three lens spokes 101–103 are provided, as shown, the corresponding number of microswitch actuating projections 144 will be provided on the scanning disk. Switch 143 is provided with a manual actuator 145 in case it is desired to continuously advance the text sheet. The speeds of rotation of the scanning disk and of advance of the text film will be adjusted as desired, for instance, to provide reading training.

The form in FIGS. 7–9 also lends itself to other uses. For instance, masking panel 150 may be provided with a vertical window slot for controlled projection of a column of figures, and this may be achieved by rotating the entire frame ninety degrees on the projector base 15. The spiral configuration of the lens spokes 111–113 contributes to uniform scanning rate. Of course, the textual material may be printed or hand-made letters, numerals, or other indicia which may be much larger than the usual printed lettering, and window 109 will be adjusted to conform either by varying its width or short dimension. Also, different types of scanner wheels may be inserted. For instance, sections thereof may be polarized for selective projection of areas of a polarized text film and special color effects may be achieved. The latter effect involves printing of a positive color transparency by means of a scanning wheel having polarized segments at different angles, and then projecting the black and white picture through a similarly-moving, selectively-polarized scanning wheel. Where such a scanning wheel rotates at, say, a rate of 12 revolutions-per-second, or faster, the projected image will appear in full color the same as the original picture. Also, the segmentally-polarized disk, in combination with a masking panel with a single restricted window, may be utilized to project different pictures previously formed on a single area of the text film through differently-angled polarizing films, for instance, in the manner of a motion picture.

The intermittent feed shown in FIG. 7 may be interchanged with that in FIG. 6. Where a considerable length of text film is used in the FIG. 11 form, operated actuating lever 120 may actuate friction wheels or rollers which bear directly upon the text sheeting and thus advance this sheeting a uniform distance irrespective of the thickness of the take-up roll (47 in FIG. 4).

Figure 10:
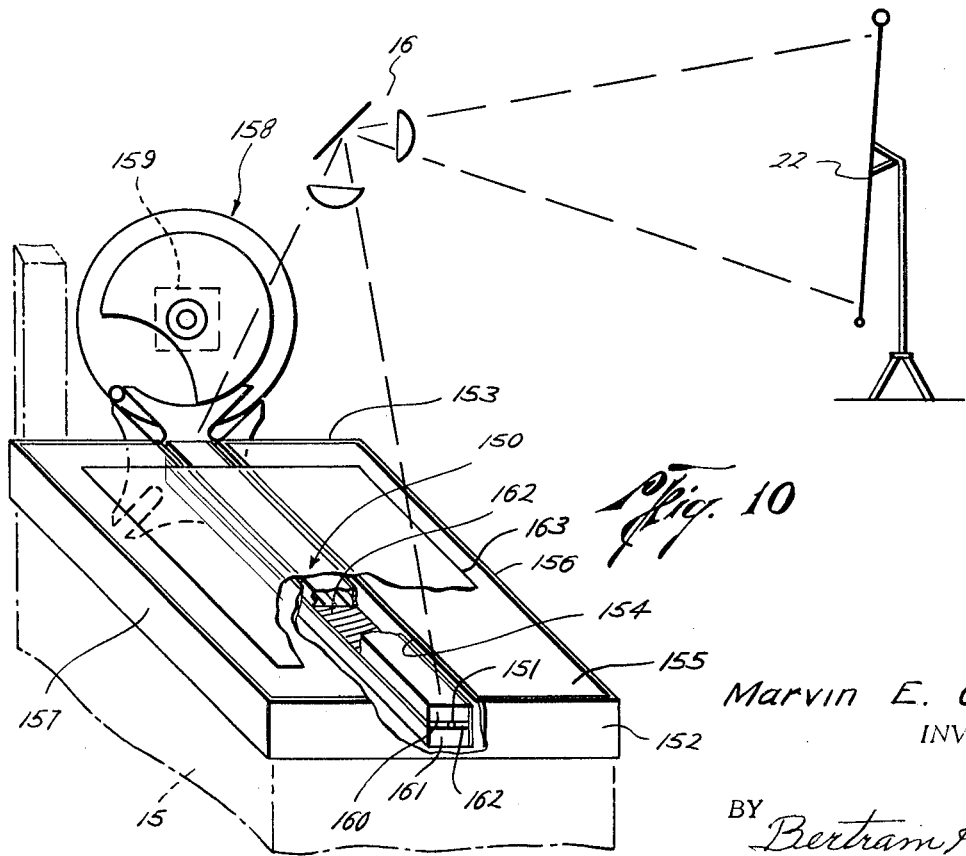
FIG. 10 is an isometric view showing a further modification of the projection adapter, parts being broken away to better illustrate the underlying structure.

FIG. 10 shows still another arrangement of the accessory adapter. In this form, an elongated, laminated lens device 150, shown greatly exaggerated in thickness for clarity, is rotatably mounted by means of journal shafts, as 151, in modified adapter end frame members 152 and 153 and exposed through an elongated, relatively narrow window 154 in top panel portion 155 of the adapter device which also has side frame pieces 156 and 157 for freely embracing the top of the projector base housing 15. The lens member is arranged for rotation in ninety-degree steps by means of Geneva mechanism suggested at 158 and an electric motor 159. The lens is constructed of top and bottom laminations 160 and 161 of clear plastic and an intervening strip 162 concentrically scored in the manner of a Fresnel lens. Lens device 150 will project light upwardly from housing 15 to diverter lens system 20 only when positioned in its predetermined upright arrangement. At such time, immediately superposed material on a text film, which may be presented from a stationary sheet, as at 163, or from rolls in the manner of the previous form, is stationarily supported above or on the adapter framing and will be projected on screen 22. During the remaining three quarters of the cycle, no image will be projected. Thus, this form may be utilized to provide a tachistoscopic effect by momentarily flashing an image on the screen, or it may be used to momentarily project a line of type juxtaposed therewith.

FIG. 11 shows a control circuit for the combination condenser lens and shutter device shown in FIG. 10. The source of power 165, in this case a battery, is connected by wires 166 through a master switch 167, cam-operated switch 168, and wires 169 and 170 to terminal 171 of small electric motor 172. The other motor terminal 173 carries the return through wire 174 to battery 165. A bypass wire 176 around cam switch 168 includes a manual switch 173.

In operation, with the condenser lens of the projector removed and suitable text material positioned above rotatable condenser lens-shutter device 150, master switch 167 will be closed. If motor 172 was previously stopped in position to hold switch 168 open, the motor can be restarted by means of a bypass switch 175, which is then immediately opened. The lens-shutter device 150 will then be rotated step by step for a complete cycle until cam switch 168 reopens. If desired, the rotation of the lens-shutter device can be continued indefinitely by manual closing of switch 175.

FIG. 12 shows an adapter frame, generally designated 178, for resting on top of projector base housing 15 in the manner of the previous forms, after the normal Fresnel lens in the projector is removed, and carrying thereabove a sealed casing having side walls 179 and 180 and end walls 181 and 182. Rotatably mounted in end walls 181 and 182 are parallel cylinders 183 of transparent material, such as plastic. Each cylinder 183 is formed of a pair of opposing segments 184 and 185, each of slightly less than 180 degrees circumference, and an intervening strip 186 formed of clear plastic scored in the manner of a Fresnel lens. Casing 179, etc., is filled with a liquid material having optical characteristics similar to those of the transparent material of which cylinders 183 are made. The cylinders are mounted on shafts, as at 187, journaled in the end frames.

FIG. 12 is a schematic representation of the interposed Fresnel strips 186 and operating means therefor, including levers 188 rigidly secured to and depending from the projecting ends of all of the shafts 187 at one end of the device. The lower extremities of all levers 188 are pinned to a link 189 which, in turn, is connected by a link 190 to the Geneva mechanism (not shown). This mechanism may be operated in the same manner as the single lens-shutter of FIG. 10 so as to alternately project and occlude a large area of indicia or other text material placed immediately above or below the lens-shuter members. Of course, in both FIGS. 10 and 12, the adapter frames and rotating lens members, in effect, form windows and masking (shutter) means for intermittently projecting text material. The lens-shutter members 150 and 183, when properly positioned, serve as the condenser lenses for directing light to the diverter system 16 and screen 162, while when these members are in other positions, they serve to prevent projection.

The novel adapter accessory device for association with an overhead type of projector may be otherwise modified for different purposes and for achieving different effects as will occur to those skilled in the art—for instance, different types of light-directing lenses may be utilized in the forms of FIGS. 7, 10, 12, and 13. It is recognized that these lenses are not true shutters but rather functional substitutes therefor having shutter-like actions. Exclusive use of all modifications as come within the scope of the appended claims is contemplated.

What is claimed is:

1. An exposure adapter for use with a conventional overhead-type projector having an illumination box with a display area in its top large enough for registry with a sheet containing directly readable indicia and a light-directing system mounted thereabove for projecting material on said indicia sheet, comprising a frame for resting on the top of said box about said display area, said frame having a pair of parallel horizontal wall members spaced one above the other, each wall member having an aperture therein forming vertically aligned windows for registry with said display area, support means bridging the space between said wall members, guide bars mounted on the upper sides of each of said wall members adjacent said apertures, and means for stably positioning masking means on one of said wall members and indicia-bearing means on the other of said wall members, the ends of at least one of said wall members being unrestricted to permit movement of a sheet thereacross.

2. An exposure adapter as described in claim 1 in which said frame is generally rectangular and wherein said support means comprise a pair of opposed side pieces extending downwardly from said wall members to embrace the sides of said box for stabilizing said frame thereon, said side pieces being of such lengths as to extend longitudinally beyond said box for mounting rolled sheet material for transport across one of said wall members.

3. An exposure adapter as described in claim 2 wherein said indicia bearing and masking means comprise sheets resting, respectively, on said wall members, a roller mounted between adjacent ends of said side pieces, one of said sheets extending about said roller, and means for actuating said roller to cause said one sheet to traverse the other of said sheets and thereby cause the projected image to scan said indicia bearing means.

4. An exposure adapter as described in claim 1 further including roll means mounted adjacent one of said wall members for impelling one of said indicia bearing and masking means thereacross, a motor for actuating said roll means, and a speed control for said motor for adjusting the rate of scanning of said indicia bearing means by said masking means.

5. An exposure adapter as described in claim 1 further including roll means mounted adjacent one of said wall members for impelling one of said indicia bearing and masking means thereacross, motor means for actuating said roll means, and an indexing control for said motor means for causing automatic, step-by-step scanning of said indicia bearing means by said masking means.

6. An exposure adapter as described in claim 1 further including bearing support means on at least one of said wall members and a shutter disk rotatably mounted on said support means.

7. An exposure adapter as described in claim 6 wherein said masking means has at least one restricted window therein, said disk having spoke-like portions of an optical character to transmit light beams passing from said display area through the restricted window in said masking means toward said light directing system and the remainder of said disk being of an optical character to prevent transmitting of said light beams to said light directing system whereby, upon rotation of said disk, indicia aligned with the window in said masking means will be scanned by said spoke-like portions and progressively projected.

8. An exposure adapter as described in claim 7 in which said spoke-like portions of said disk extend spirally for causing scanning of indicia aligned with the window in said masking means at a uniform rate.

9. An exposure adapter as described in claim 1 further including pivotally mounted lens structure mounted adjacent and in registry with said wall members, said lens structure being of optical character to direct light from said display area toward said light-directing system only when said structure is in a predetermined position relative to said area and will obscure said light when said structure is otherwise positioned, and means for rotating said lens structure to momentarily expose indicia on said indicia bearing means.

10. An exposure-adapter device as described in claim 9 in which said lens structure is elongated and rectangular in section and is pivoted about its longitudinal axis.

11. An exposure-adapter device as described in claim 10 in which said lens structure consists of a Fresnel lens.

12. An exposure-adapter device as described in claim 9 further including additional rotatable lens structures each of the same type as said first-mentioned lens structure and means to rotate all of said structures to selectively expose said indicia.

13. The combination with a conventional overhead projector having an illumination box with a display window large enough for registry with a sheet containing directly readable indicia and a light-directing system mounted thereabove for projecting material on said sheet, of an adapter device comprising a frame having an aperture therein mounted on said box about said display window, supports on said frame for positioning indicia and masking instrumentalities in projecting juxtaposition with relation to said window, motor means for moving at least one of said instrumentalities across said window, speed control means for said motor means, and means operatively connected to said motor means for causing intermittent motion of said last-mentioned instrumentality and step-by-step projection of material on said indicia instrumentality.

References Cited

UNITED STATES PATENTS

| | | |
|---|---|---|
| 2,813,457 | 11/1957 | Fitzgerald. |
| 3,269,261 | 8/1966 | Porter. |
| 3,279,109 | 10/1966 | Whittum. |
| 3,317,151 | 5/1967 | Wright. |
| 3,320,854 | 5/1967 | Wally. |

NORTON ANSHER, Primary Examiner

R. M. SHEER, Assistant Examiner

U.S. Cl. X.R.

353—25, 97, 98